United States Patent Office 3,248,442
Patented Apr. 26, 1966

3,248,442
ALKYLATION OF AROMATIC HYDROCARBONS
Anthony George Goble and John Vincent Fletcher, Sunbury-on-Thames, Middlesex, England, assignors to The British Petroleum Company Limited, London, England, a British joint-stock corporation
No Drawing. Filed Aug. 21, 1962, Ser. No. 218,453
Claims priority, application Great Britain, Sept. 11, 1961, 32,502/61
8 Claims. (Cl. 260—671)

This invention relates to the alkylation of aromatic hydrocarbons with olefins or olefin-acting compounds.

The alkylation of aromatic hydrocarbons with olefins is a well known reaction which may be carried out using as catalyst a Friedel-Crafts halide, for example, aluminium chloride or boron trifluoride, or an acid, for example hydrofluoric acid. The present invention is concerned with the use of a new class of catalysts in aromatic alkylation reactions.

According to the present invention a process for the alkylation of aromatic hydrocarbons comprises reacting an aromatic hydrocarbon with an olefin or olefin-acting compound under alkylation conditions with a catalyst prepared by contacting alumina with a compound of general formulae:

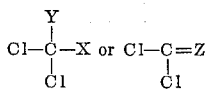

where X and Y may be the same or different and are selected from the group consisting of H, Cl, Br and SCl and where Z is selected from the group consisting of O and S under non-reducing conditions and at a temperature such that chlorine is taken up by the alumina without the production of free aluminium chloride.

The preferred aromatic hydrocarbons are monocyclic aromatics, for example benzene or alkyl benzenes, but the process may also be applied to polynuclear aromatics, for example naphthalene and alkyl naphthalenes, and also to compounds having two or more aryl groups, for example diphenyl. The olefins may contain one or more double bonds and may be acyclic or cyclic olefins. Preferably they are acyclic olefins having from 2 to 18 carbon atoms, for example ethylene, propylene, butenes, isobutylene, pentene or propylene tetramer. Mixtures of olefins may also be used, and the olefins may also be admixed with other inert materials for example nitrogen or saturated hydrocarbons. Thus refinery gas streams containing one or more olefin hydrocarbons may be used, for example the normally gaseous product from a thermal or catalytic cracker. Examples of suitable olefin-acting compounds are alkyl halides, particularly chlorides and bromides, having more than two carbon atoms per molecule, which are capable of being dehydrohalogenated to form olefinic hydrocarbons, for example the chlorides of acyclic aliphatic hydrocarbons having from 2 to 6 carbon atoms.

The alkylation conditions employed will depend on the reactants used but the temperature will normally be within the range 0 to 300° C., preferably 15–200° C. and the pressure from atmospheric to 100 p.s.i.g. Preferably the aromatic hydrocarbon is in excess of the olefin or olefin-acting compound, suitable ratios being from 2 to 1 to 20 to 1. Higher ratios tend to reduce the formation of polyalkylated products and are thus particularly desirable when it is desired to produce predominantly monoalkylated products. The liquid space velocity of the aromatic hydrocarbon may be in the range of 0.1 to 20 v./v./hr., preferably 0.5 to 5 v./v./hr.

The process is desirably carried out under anhydrous conditions and with water-free reactants to minimise loss of halogen from the catalyst.

The catalyst used and its method of preparation is described in copending U.S. patent application Ser. No. 135,426, filed September 1, 1961.

A particular feature of the catalyst preparation is the use of the specific compounds of the general formula indicated, these compounds giving a specific form of chlorination which produces active low temperature conversion catalysts. The following examples of compounds giving active and inactive catalysts respectively illustrate the specific nature of the compounds used.

Compounds giving active catalysts:
Carbon tetrachloride ($CCl_4$)
Chloroform ($CHCl_3$)
Methylene chloride ($CH_2Cl_2$)
Trichlorobromomethane ($CCl_3Br$)
Thiocarbonyltetrachloride ($CCl_3SCl$)

Compounds giving inactive catalysts:
Hydrogen chloride (HCl)
Chlorine ($Cl_2$)
Methyl chloride ($CH_3Cl$)
Acetyl chloride ($CH_3COCl$)
Dichloroethane ($CH_2Cl$—$CH_2Cl$)
Tetrachloroethane ($CHl_2$—$CHCl_2$)
Tetrachloroethylene ($CCl_2$=$CCl_2$)

In the case of compounds containing elements other than chlorine, carbon and hydrogen, the treatment may add the other elements to the catalyst in addition to the chlorine. It has been found, however, that catalysts so prepared are still active for low temperature conversion, and they may have, in addition, other properties resulting from the addition of the other elements. It has also been found that small amounts of halogens (including chlorine) which may be present in the alumina prior to the chlorination treatment of the present invention do not affect the activity of the catalysts for low temperature conversion although this halogen may not contribute in any way to the catalyst activity. Thus, the alumina used may already contain up to 1% wt. of chlorine and/or fluorine, as when, for example, the material which is chlorinated by the process of the present invention is a catalyst normally used for the reforming of gasoline boiling range hydrocarbons. The preferred compounds giving active catalysts are carbon tetrachloride, chloroform and methylene chloride.

The compounds covered by the general formula in which X and Y together are O or S are phosgene and thiophosgene.

Any convenient form of alumina may be used which contains active acid sites. This is a characteristic of activated aluminas, which contain halogenatable sites, often having an associated hydrogen atom, and which may be surface hydroxyl groups. The chlorinating compounds react with these surface sites eliminating an oxygen atom from them, and producing carbon oxides, and/or phosgene and, sometimes water, although the catalysts still contain a measurable quantity of hydrogen. The amount of chlorine added to the catalyst is preferably within the range 1 to 15% wt., the precise amount being dependent on the original alumina surface area as measured by low temperature nitrogen absorption. It has been found that for maximum amount of chlorine which can be added without the formation of free aluminium chloride is related to the surface area and is about $3.0–3.5 \times 10^{-4}$ g./m.$^2$. Maximum chlorination is preferred, but lower amounts of chlorine still give active catalysts and a suitable range is, therefore, from $2.0 \times 10^{-4}$ to $3.5 \times 10^{-4}$ g./m.$^2$.

If desired, the alumina may contain one or more other refractory oxides selected from the oxides of elements of Groups II to VI of the Periodic Table, for example beryllia, zirconia, boria, silica, titania, or vanadium pentoxide, preferably in an amount of less than 50% wt.

The non-reducing conditions used for the chlorination may be either inert or oxidising conditions, the latter being preferred. A convenient method of contacting the alumina is to pass a gaseous stream of the chlorine compound over the alumina either alone or, preferably, in a non-reducing carrier gas. Examples of suitable carrier gases are nitrogen, air or oxygen.

Non-reducing conditions are essential, since reducing conditions tend to convert the chlorine compound to hydrogen chloride, which gives an inactive catalyst. The temperature for the chlorination may be from 300–1100° F. (149–593° C.). The tendency to form free aluminium chloride increases with temperature and care should, therefore, be exercised when using the higher temperatures within the stated range. Since the temperatures used will normally be above the volatilisation temperature of aluminium chloride the formation of free aluminium chloride is readily detected by its appearance in the gaseous reaction products. The chlorination reaction is exothermic and the temperatures specified are the initial temperatures used.

The rate of addition of the chlorine compound is preferably as low as practical to ensure uniform chlorination and to avoid a rapid increase of temperature as a result of the exothermic reaction. Preferably the addition rate does not exceed 1.3% wt. of chlorine compound by weight of catalyst per minute. If a carrier gas is used the rate of flow is preferably at least 200 volumes/volume of catalyst/hour and a convenient range is 200–1000 v./v./hr. The pressure used is conveniently atmospheric.

The active catalyst is susceptible to hydrolysis in the presence of water and should, therefore, be stored under anhydrous conditions. Similarly the materials used in the catalyst preparation should also be free from water.

The invention is illustrated by the following examples.

*Example 1*

An alumina having a surface area of 350 m.²/g., was prepared from aluminium isopropoxide as follows:

1200 g. of aluminum isopropoxide were dissolved in 6 litres of Analar benzene. 4 litres of deionised water were added with vigorous stirring. After ½ hr. the benzene layer was decanted, a further 4 l. of deionised water were added and stirring continued overnight. The alumina hydrogel slurry was centrifuged and washed with 12 litres of deionised water to remove any residual isopropanol. 3,200 g. of filter cake containing approximately 300 g. of alumina were obtained. After drying and calcining 150 ml. of the alumina was placed in a vertical reactor maintained at 390° C. and purged with dry nitrogen flowing at 100 ml. per minute for 1 hour. 30 ml. of dry carbon tetrachloride was then added dropwise to the heated catalyst over a period of 30 minutes while the nitrogen purge was maintained. Finally, the resulting composite was flushed with dry nitrogen for a further 1 hour.

The chlorine content of the resulting catalyst was 12.0% wt.

The catalyst was used to react propylene and benzene at a temperature of 133° C., a pressure of 50 p.s.i.g. and a space velocity of the benzene of 1.0 v./v./hr. The benzene/propylene mole ratio was 4.7:1.

Analysis of the product after 11–12 hours on stream gave the following composition:

| | Percent weight |
|---|---|
| Benzene | 73.2 |
| Cumene | 16.9 |
| Di-isopropyl benzene | 7.7 |
| Tri-isopropyl benzene | 1.7 |
| Tetra-isopropyl benzene | 0.3 |

The di-isopropylbenzene fraction (7.7% wt. of product) was a mixture of all three isomers viz:

| | Percent |
|---|---|
| 1:2 isomer (0.3% wt.) | 4.0 |
| 1:3 isomer (3.1% wt.) | 40.0 |
| 1:4 isomer (4.3% wt.) | 56.0 |
| | 100.0 |

*Example 2*

150 ml. of an alumina, having a surface area of 300 m.²/g., was prepared from aluminium isopropoxide in a manner similar to that described in Example 1.

The alumina was placed in a vertical reactor maintained at 300° C. and purged with dry nitrogen flowing at 100 ml. per minute for half an hour. 30 ml. of dry carbon tetrachloride was then added dropwise to the catalyst over a period of half an hour and then the catalyst was finally purged with dry nitrogen for a further 1 hour.

The chlorine content of the resulting catalyst was 10.3% wt. and it had a negligible carbon content ($<$0.01% wt.).

The catalyst was used to react benzene with a gas stream containing 95% vol. ethylene and 5% vol. hydrogen at a pressure of 200 p.s.i.g. and a space velocity of the benzene of 1.5 v./v./hr. The benzene/ethylene mole ratio was 4:1. Analysis of the products at different hours on stream and different reaction temperatures gave the following results:

| | 3–4 | 9–10 |
|---|---|---|
| Hours on stream | | |
| Reaction temperature, °C | 125 | 150 |
| Benzene, percent wt | 86.4 | 76.3 |
| Ethylbenzene, percent wt | 12.2 | 20.1 |
| Diethylbenzene, percent wt | 1.4 | 3.6 |
| Higher ethyl benzenes, percent wt | trace | trace |

*Example 3*

A catalyst was prepared by the method described in Example 2.

The chlorine content of the catalyst was 10.3% wt.

The catalyst was used to react benzene with an olefin-containing gas from the high pressure separator of a stream cracker. The gas contained 19.3% mol. of ethylene and 7.2% mol. of propylene.

The alkylation temperature was 150° C., the pressure 150 p.s.i.g. and the benzene/olefin mol. ratio was 6.4:1. Analysis of the product at different hours on stream and different benzene space velocities gave the following results:

| | 6–7 | 8–9 | 11–12 |
|---|---|---|---|
| Hours on stream | | | |
| Benzene space velocity, v./v./hr | 1.5 | 2.0 | 3.0 |
| Benzene, percent wt | 81.3 | 85.9 | 90.8 |
| Ethylbenzene, percent wt | 11.4 | 7.2 | 1.8 |
| Isopropyl benzene, percent wt | 5.4 | 5.7 | 6.1 |
| Higher alkyl benzene, percent wt | 1.7 | 1.2 | 1.3 |

A particular feature of the results is that while the yield of ethylbenzene decreased with increasing space velocity, the yield of isopropyl benzene increased slightly, indicating that the use of higher space velocities is possible with propylene.

We claim:

1. A process for the low temperature alkylation of aromatic hydrocarbons comprising reacting an aromatic hydrocarbon with a compound selected from the class consisting of olefins and olefin-acting compounds at a temperature in the range of 15–200° C. with a catalyst prepared by contacting alumina with a compound of general formulae:

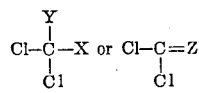

where X and Y may be the same or different and are selected from the group consisting of H, Cl, Br and SCl and where Z is selected from the group consisting of O and S under non-reducing conditions and at a temperature in the range of 149–593° C. such that chlorine is taken up by the alumina without the production of free aluminum chloride the catalyst containing chlorine in an amount from $2.0 \times 10^{-4}$ to $3.5 \times 10^{-4}$ g./sq. meter of the original alumina surface area.

2. A process as claimed in claim 1 wherein the aromatic hydrocarbon is a monocyclic aromatic.

3. A process as claimed in claim 1 wherein the olefin is an acyclic olefin having from 2 to 18 carbon atoms.

4. A process as claimed in claim 1 wherein the alkylation reaction pressure is from atmospheric to 1000 p.s.i.g.

5. A process as claimed in claim 1 wherein the aromatic hydrocarbon is in excess of the olefin or olefin-acting compound in the ratio from 2:1 to 20:1.

6. A process as claimed in claim 1 wherein the liquid space velocity of the aromatic hydrocarbon is from 0.1 to 20 v./v./hr.

7. A process as claimed in claim 6 wherein the liquid space velocity of the aromatic hydrocarbon is from 0.5 to 5 v./v./hr.

8. A process according to claim 1 wherein the chlorine containing compound reacted with alumina in the formation of the catalyst is carbon tetrachloride.

References Cited by the Examiner
UNITED STATES PATENTS

| | | | |
|---|---|---|---|
| 2,584,103 | 2/1952 | Pines et al. | 260—671 |
| 2,642,384 | 6/1953 | Cox | 208—139 |
| 2,880,168 | 3/1959 | Feller | 208—140 |
| 2,937,897 | 6/1960 | Beber et al. | 260—683.48 |
| 3,041,272 | 6/1962 | Burk et al. | 208—139 |

DELBERT E. GANTZ, *Primary Examiner.*

ALPHONSO D. SULLIVAN, *Examiner.*